No. 618,931. Patented Feb. 7, 1899.
G. V. BARNES.
THILL COUPLING.
(Application filed Dec. 7, 1897.)

(No Model.)

WITNESSES.
Will Stout.
F. W. Reeves

Gaylord V. Barnes, INVENTOR,
BY Charles N. Woodward, Atty.

THE NORRIS PETERS CO., PHOTO-LITHO., WASHINGTON, D. C.

United States Patent Office.

GAYLORD V. BARNES, OF ST. PAUL, MINNESOTA.

THILL-COUPLING.

SPECIFICATION forming part of Letters Patent No. 618,931, dated February 7, 1899.

Application filed December 7, 1897. Serial No. 661,020. (No model.)

*To all whom it may concern:*

Be it known that I, GAYLORD V. BARNES, a citizen of the United States, residing at St. Paul, in the county of Ramsey and State of Minnesota, have made certain new and useful Improvements in Thill-Couplings, of which the following is a specification.

This invention relates to thill-couplings; and it consists in the construction, combination, and arrangement of parts, as hereinafter shown and described, and specifically pointed out in the claims.

Figure 3:
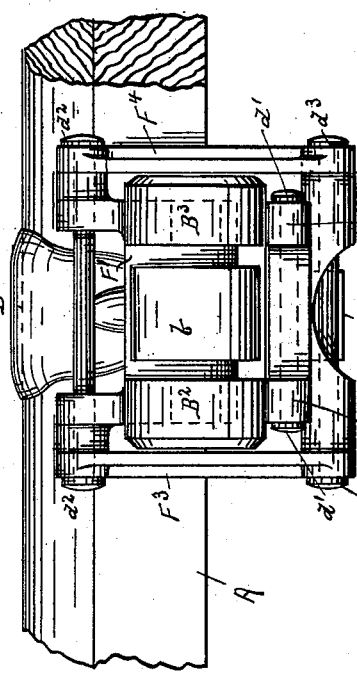
Figure 4:
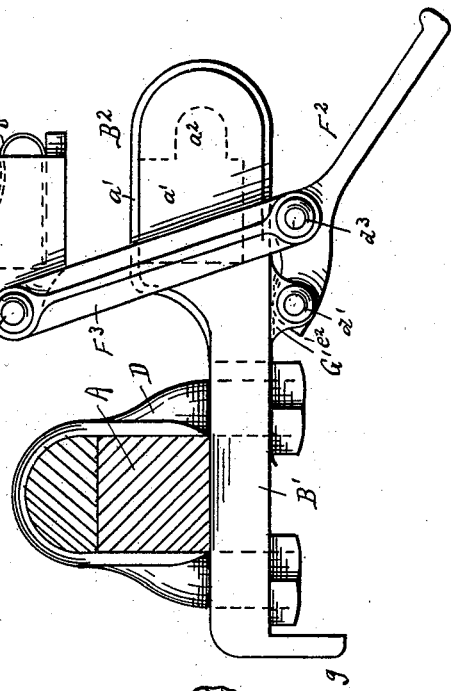
Figure 1:
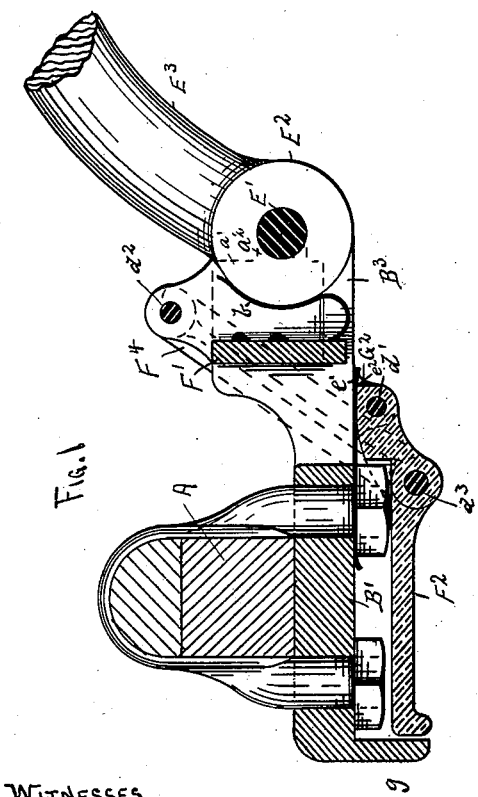
Figure 2:
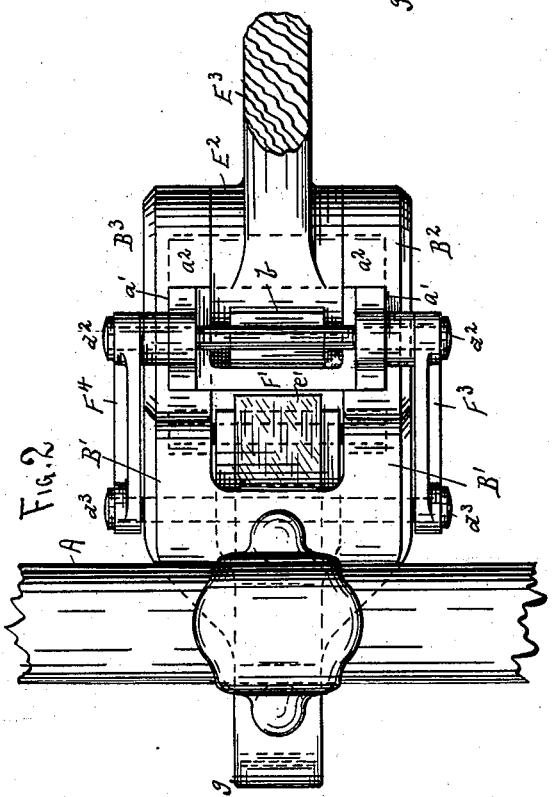

In the drawings, Figure 1 is a longitudinal sectional elevation, and Fig. 2 is a plan view, of the thill-coupling, with the shank of a tongue or pair of thills in position therein. Fig. 3 is a front elevation with the shank removed. Fig. 4 is a side elevation with the locking-block or coupling disconnected for the removal of the shank.

A represents a portion of the axle, to which the body B' of the coupling is connected by a clip D in the ordinary manner. The forwardly-projecting portion of the part B' is formed "bifurcated" or with two parts $B^2$ $B^3$ with recesses $a'$ in their inner faces and with sockets $a^2$ leading from the recesses for the reception of the ends of a stud E', which passes through the eye $E^2$ of the shank $E^3$ of the tongue or thill, as shown in Figs. 1 and 2. By this means the shank is held in place between the ears $B^2$ $B^3$ and prevented from displacement by any forward or upward-and-downward movement and removable only by being moved backward.

To prevent any backward movement of the shank, a lock-block F' is provided and adapted to be inserted into the recesses $a'$ and fitting downward behind the eye portion $E^2$ of the shank and preferably with a spring $b$ to press against the eye $E^2$ and prevent any undue motion or rattling. By this means the shank and the thill or tongue supported thereby are irremovable so long as the block F' is in position behind the eye, as in Figs. 1 and 2.

Means are provided for removing the lock-block and also for holding it in position behind the eye of the shank, consisting in a lever $F^2$ and two side bars $F^3$ $F^4$, connecting the lever to the block F', as shown. The lever is pivoted at its fulcrum-point $d'$ to ears G' $G^2$ on the bottom of the frame B', the fulcrum-point being so placed that when the lever is drawn backward, as in Fig. 1, the line between the pivotal points $d^2$ $d^3$ of the side bars $F^3$ $F^4$ will pass back of the pivotal point $d'$ of the lever, so that the block F' will be "locked" in its downward position. A spring $e'$ is arranged to press upon a square shoulder $e^2$ on the outer end of the lever $F^2$ to hold it in the position shown in Fig. 1 and prevent accidental displacement of the lever. The spring $e'$ will be strong enough to resist any accidental movement of the lever, but will yield to the force necessary to move the lever when the lock-block F' is to be removed to permit the shank to be disconnected.

The rear end of the body B' is formed with a downwardly-projecting lip $g$ to form a guard to the free end of the lever $F^2$ to prevent brush or other material over which the vehicle may be drawn from displacing the lever.

By this simple device the thills may be very readily connected or disconnected or a tongue substituted for thills, or vice versa, and without providing for the removal of any of the parts or the disfigurement of the vehicle or the thill or tongue.

The coupling can be attached to any vehicle in place of the ordinary thill-coupling, using the clips already in use. It is also adapted to the ordinary shank and eye, the spring $b$ automatically yielding or extending to adapt itself to any variation of the sizes of the eyes $E^2$.

Having thus described my invention, what I claim as new is—

1. In a thill-coupling, a jaw having ears between which the head of the thill-shank fits and with inwardly-opening recesses to receive the ends of the coupling pin or bolt, sockets in the inner faces of said ears leading into said recesses, a lock-block fitting said sockets and projecting across the rear of said thill-shank head, a lever pivoted beneath said jaw, and side bars connecting said lever and said lock-block, whereby when said lever is actuated, the block will be locked into its sockets, substantially as set forth.

2. In a thill-coupling, a jaw having ears between which the head of the thill-shank fits and with inwardly-opening recesses to receive the ends of the coupling pin or bolt, sockets in the inner faces of said ears leading into said recesses, a lock-block fitting said sockets and projecting across the rear of said thill-shank head, a spring between said thill-shank head and said lock-block, a lever pivoted beneath said jaw, and side bars connecting said lever and said lock-block, whereby when said lever is actuated, the block will be locked into its sockets, substantially as set forth.

3. In a thill-coupling, a jaw having ears between which the head of the thill-shank fits and with inwardly-opening recesses to receive the ends of the coupling pin or bolt, sockets in the inner faces of said ears leading into said recesses, a lock-block fitting said sockets and projecting across the rear of said thill-shank head, a lever pivoted beneath said jaw, and side bars connecting said lever and said lock-block, said jaw extended rearwardly and secured to the axle, and provided with a downwardly-projecting guard to prevent the accidental displacement of said lever, substantially as set forth.

In testimony whereof I hereunto set my hand in the presence of two subscribing witnesses.

GAYLORD V. BARNES.

In presence of—
J. W. MARTIN,
C. N. WOODWARD.